Sept. 23, 1952    J. LYNES    2,611,437
HIGH PRESSURE INFLATABLE PACKER
Original Filed Jan. 29, 1943    7 Sheets-Sheet 4

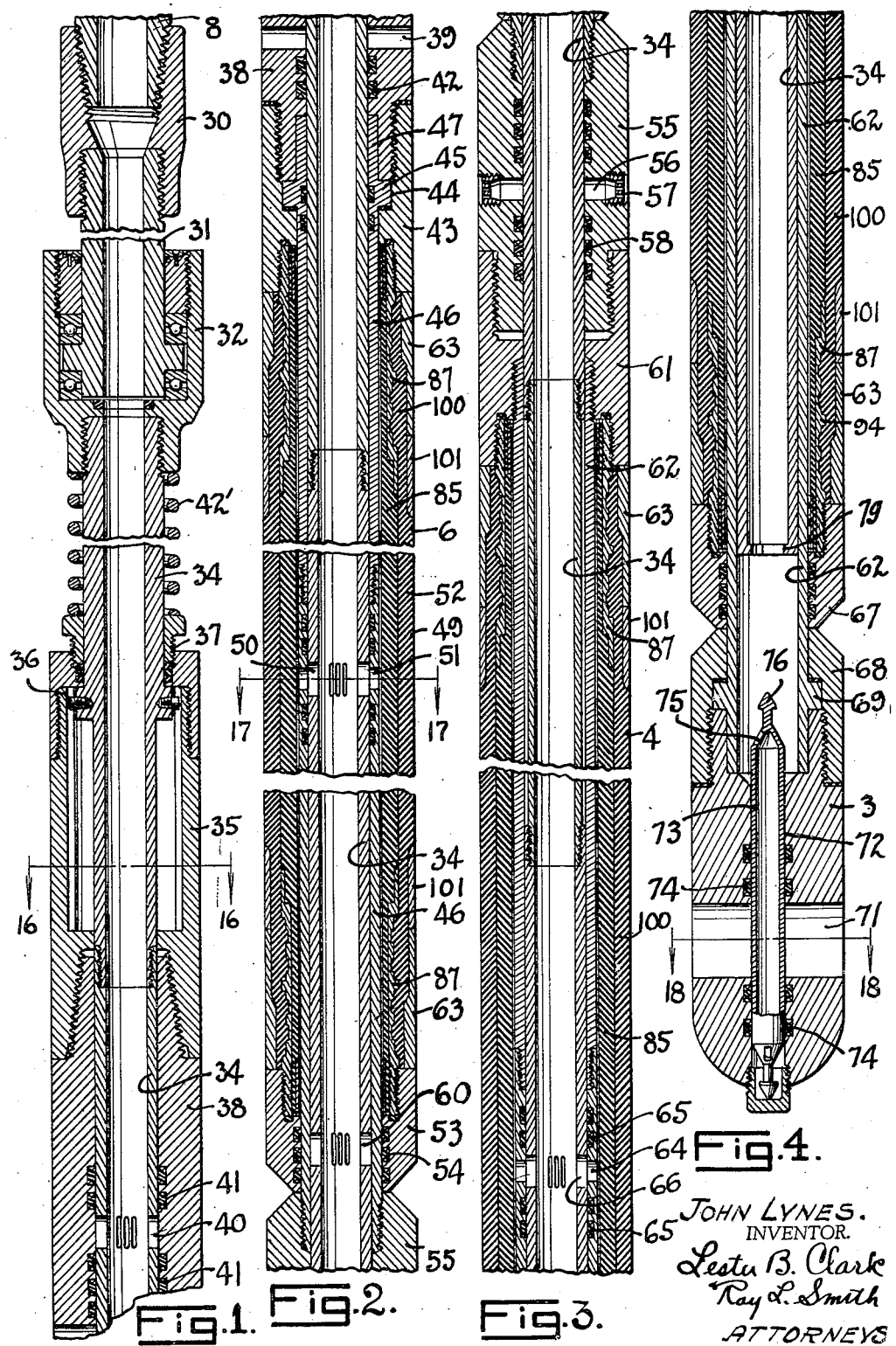

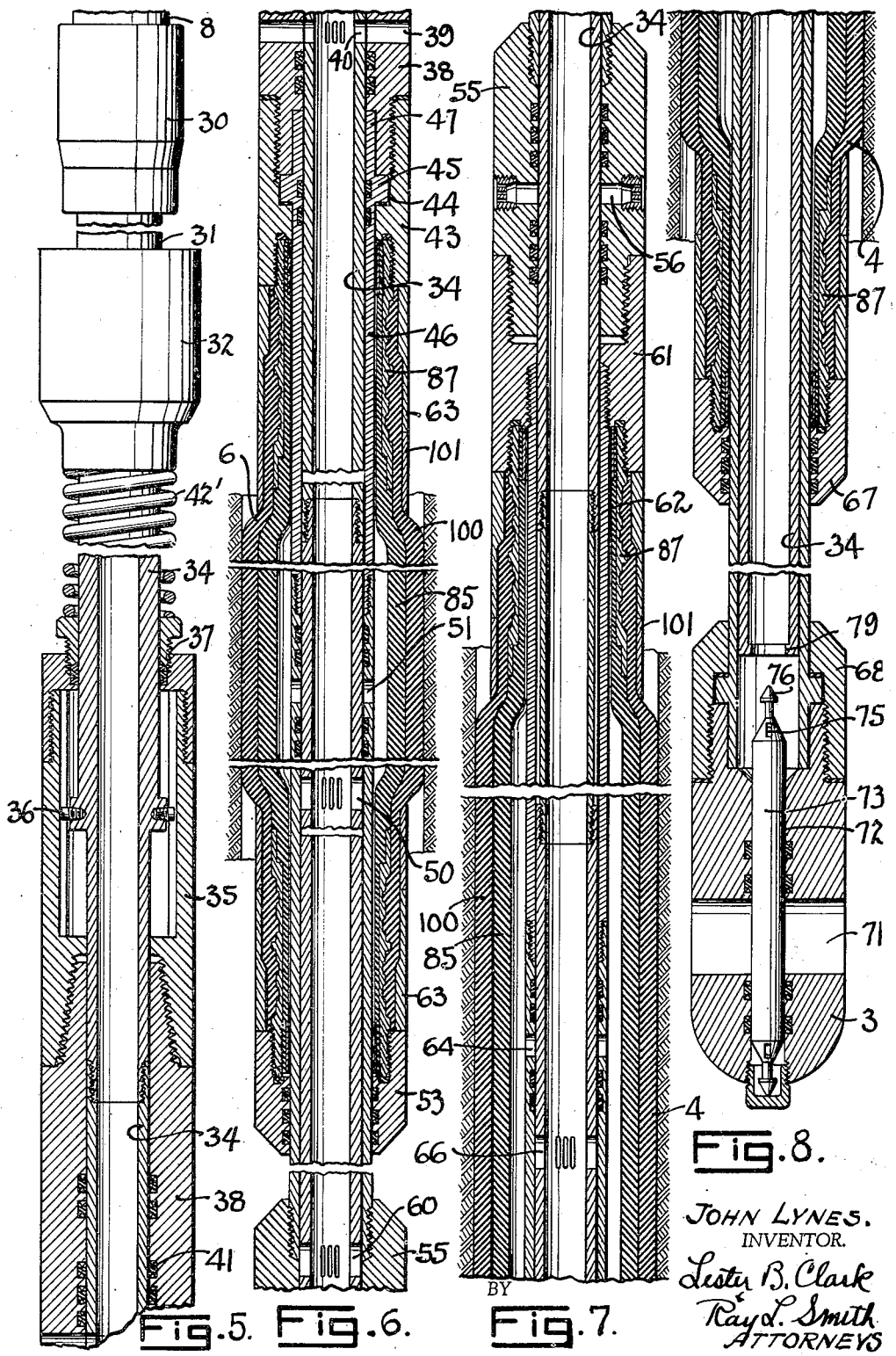

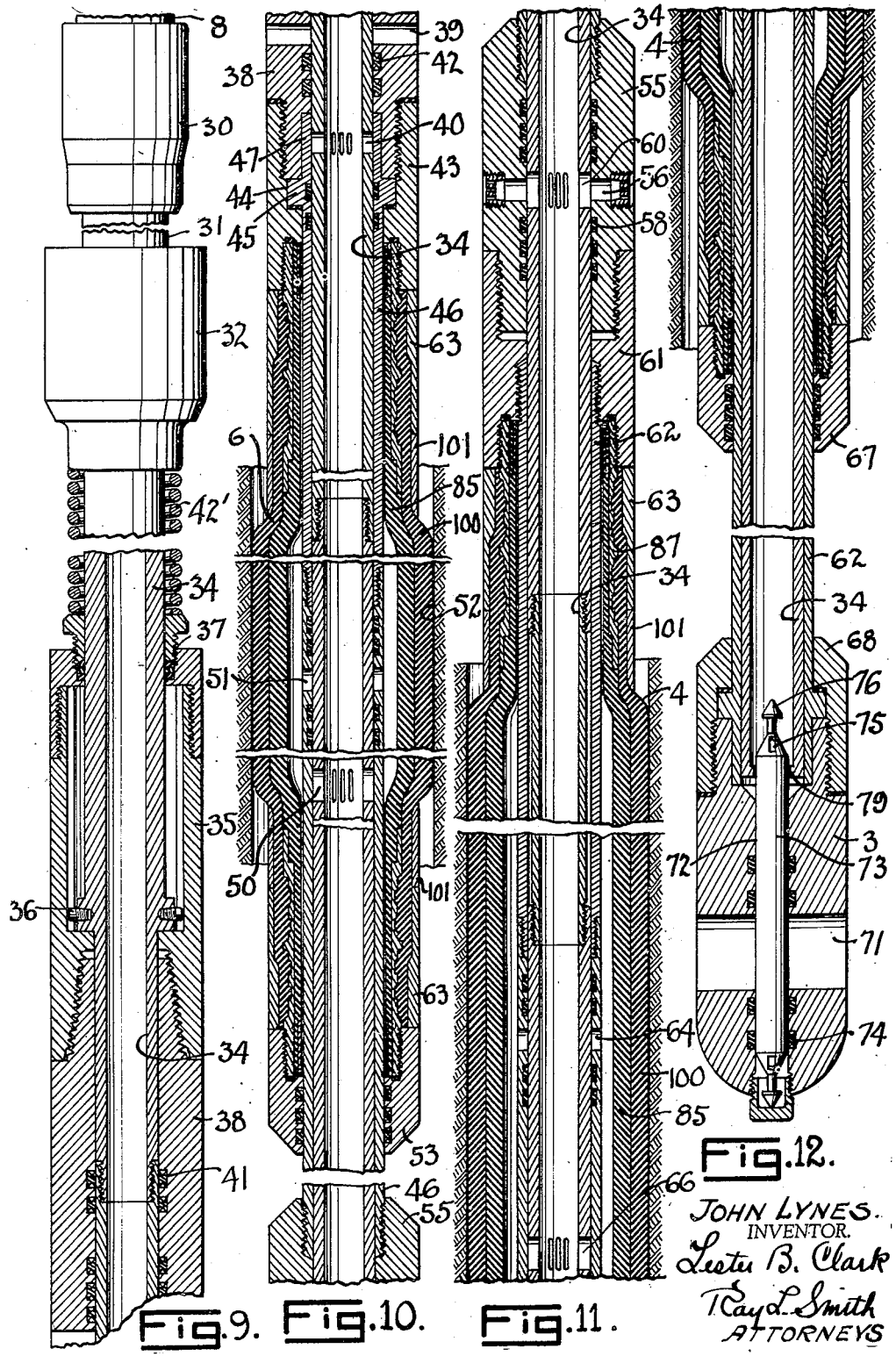

JOHN LYNES.
INVENTOR.
Lester B. Clark
Ray L. Smith
ATTORNEYS

Sept. 23, 1952  J. LYNES  2,611,437
HIGH PRESSURE INFLATABLE PACKER
Original Filed Jan. 29, 1943  7 Sheets-Sheet 5
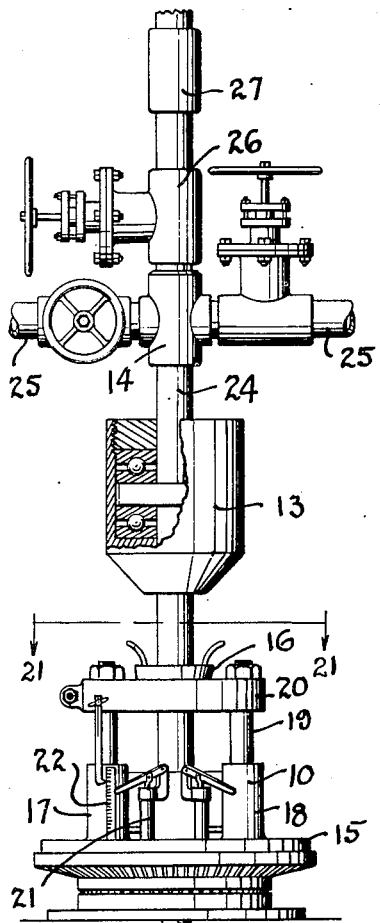
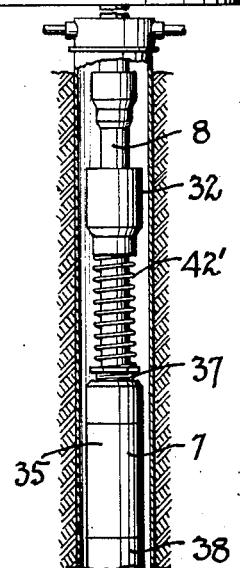
Fig. 19.
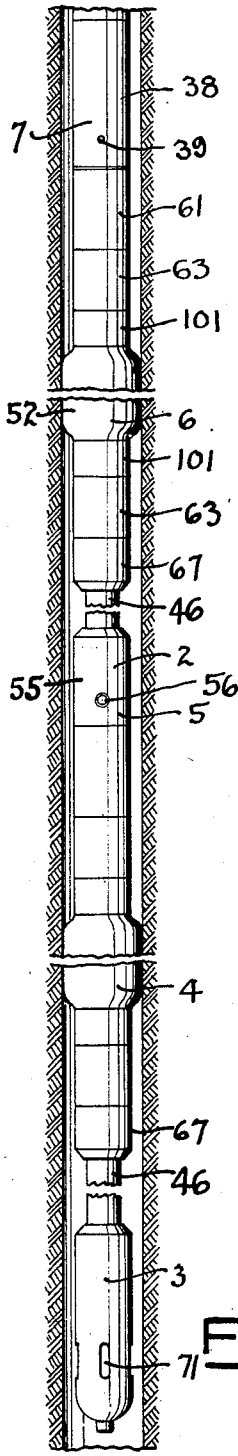
Fig. 20.
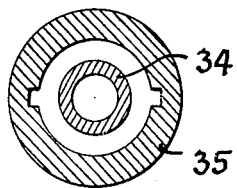
Fig. 16.
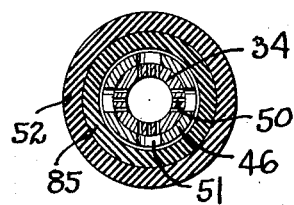
Fig. 17.
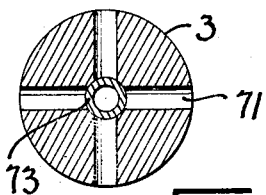
Fig. 18.
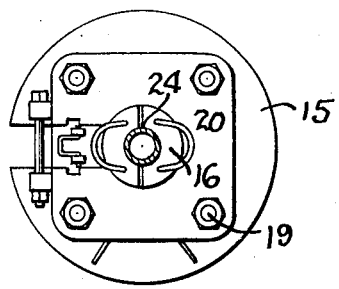
Fig. 21.
JOHN LYNES.
INVENTOR.
Lester B. Clarke
Ray L. Smith
ATTORNEYS Sept. 23, 1952 J. LYNES 2,611,437
HIGH PRESSURE INFLATABLE PACKER
Original Filed Jan. 29, 1943 7 Sheets-Sheet 6

JOHN LYNES.
INVENTOR.
Lester B Clark
Ray L. Smith
ATTORNEYS

Patented Sept. 23, 1952

2,611,437

UNITED STATES PATENT OFFICE 2,611,437

HIGH PRESSURE INFLATABLE PACKER

John Lynes, Houston, Tex., assignor to Lynes, Inc., Houston, Tex., a corporation of Texas Original application January 29, 1943, Serial No. 473,928. Divided and this application December 17, 1948, Serial No. 65,843

12 Claims. (Cl. 166—10)

1

The invention relates to a high pressure hydraulic inflatable packer for isolating a section of a formation at any desired elevation in a well bore.

In the drilling of wells by a rotary method a drilling mud is circulated into and out of the well bore. This drilling mud is often made exceptionally heavy by adding finely ground heavy chemicals thereto. In some instances the specific gravity is raised to 2, so that a column of mud in the well bore will create a tremendous static pressure upon the face of the formation adjacent to the bottom of a hole. For instance, in a 11,500 foot well filled with drilling mud having a specific gravity of 2, there would be a pressure of approximately 10,000 pounds per square inch on the face of the formation.

The present invention is in the nature of an improvement over the apparatus shown in my prior Patent No. 2,227,731, dated January 7, 1941, and constitutes an improvement in the arrangement of the packer structure.

It is one of the objects of the invention to provide a hydraulic packer which can be sealed in a well bore so as to exclude high pressures.

Another object of the invention is to provide a hydraulic inflatable packer which can be set to withstand substantially high pressures.

Still another object of the invention is to provide a testing tool packer which can be manipulated in a well bore against extremely high pressures.

Still another object of the invention is to provide an arrangement of fabrication of a resilient reinforced type of hydraulically inflatable packer whereby the ends are securely anchored to prevent rupture due to high pressures.

Other and further objects of the invention will be readily apparent when the following description is considered in connection with the accompanying drawings wherein:

Figs. 1, 2, 3 and 4 make up composite vertical sectional views of the tool in condition to be run into the well bore.

Figs. 5, 6, 7 and 8 form a composite view illustrating in vertical section the tool after it has been run into the hole and manipulated to inflate the packers and open the tool for circulation above the packers.

Figs. 9, 10, 11 and 12 form another composite view with the tool opened to the isolated section of the formation between the packers so as to discharge or receive fluid.

Figs. 13, 14 and 15 are vertical sectional views of the lower end of the tool illustrating the various steps in opening the tool for circulation below the packers.

Figs. 16, 17 and 18 are sectional views taken on the lines 16—16, 17—17 and 18—18 respectively of Figs. 1, 2 and 4.

Figs. 19 and 20 illustrate diagrammatically a side elevation of the tool set in position in the well bore and particularly illustrate the surface equipment for manipulating and rotating the operating pipe.

Fig. 21 is a section taken on line 21—21 of Fig. 19.

Figure 13:
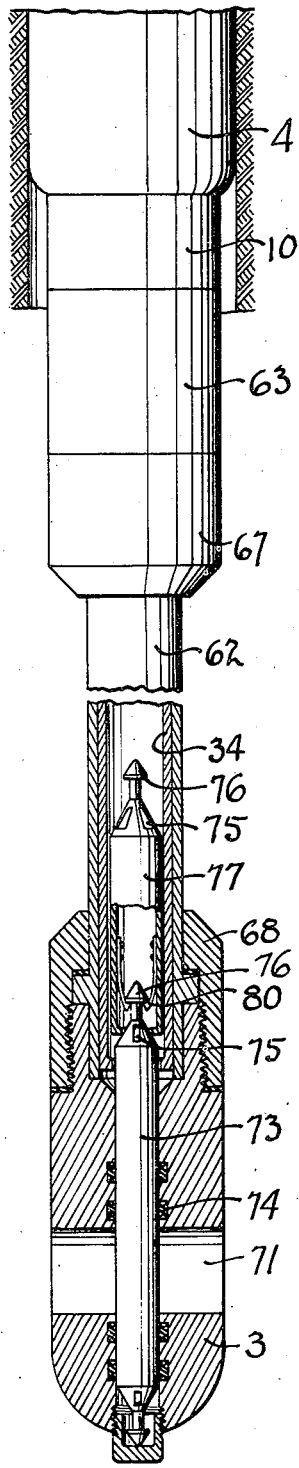

Figs. 19 and 20 illustrate the general assembly in which the tool is illustrated generally at 2 and includes the foot piece or bottom 3, the lower packer assembly 4, the intermediate discharge or entry section 5, the upper packer 6, the circulating section 7, the operating pipe 8 and the hydraulic lift 10 in combination with the swivel 13 and the well head assembly 14.

The tool will be assembled by connecting together the various parts in the order in which they have been named and gradually lowering the tool into the well bore until the packers 4 and 6, see Fig. 20, are spaced below and above respectively of the isolated section of the formation which is to be treated or tested.

The manipulating equipment at the surface includes a rotary 15 which may grip the pipe with a suitable set of slips or other driving members 16. These slips also serve to support the operating pipe 8 and the tool 2. During the movement and operation of the tool as will be later explained, it is necessary to raise and lower the operating pipe and to effect its rotation. To accomplish this a hydraulic lift 17 is shown as having been disposed on the rotary table. This lift includes the cylinders 18 and the plungers 19 which are connected to a ring 20 which, in turn, receives the slips 16. By operating the hydraulic pumps 21 in a suitable manner this lift 20 may be adjusted as desired. An indicator 22 shows the exact position of the pipe which is important because the longitudinal movement of the operating pipe serves to open and close the tool and the circulation ports in practicing the method.

In order that suitable flow line connections may be made with the pipe 8 a swivel 13 is provided so that the section of pipe 8 may be rotated by the rotary table 15 while the upper section of pipe 24 may remain stationary while being connected to the flow lines 25.

The master control valve 26 is mounted on the pipe 24 above the flow lines 25 so as to close the well completely if desired. Any swabbing, pumping or bailing operations can be carried out thru the upper open end extension 27 of the pipe 24.

Figs. 1 to 4 inclusive show a sectional view of the tool as it is assembled, ready to be lowered into the well bore and illustrate the operating or manipulating pipe 8 which is connected to a coupling 30. This coupling, in turn, is connected to a nipple 31 mounted in a swivel box 32 so that the pipe 8 may rotate independently of the tool 2 which is carried by the swivel box 32.

A central control pipe 34 is threaded into the swivel box 32 and by means of various jointed sections extends entirely through the tool.

Mounted on this central control pipe 34 is a housing 35 which is made up of a plurality of sections in which a slidable non-rotatable connection is mounted at 36 so that the control pipe and the housing 35 are non-rotatably connected. A stuffing box 37 provides a seal above this sliding driving connection.

The next element of the housing 35 is a pipe section 38 disposed about the control pipe 34 and having a discharge port 39 therein adjacent its lower end as best seen at the top of Fig. 2. It will be understood that the control pipe 34 is slidably, or telescopically mounted in the housing 35, and this control pipe has a series of openings 40 therein which are normally disposed between the sets of packing 41 on the inside of the housing section 38 so that fluid pressure occurring in the inside of the control pipe 34 will be completely sealed off against leakage in the housing.

The control pipe, however, is capable of telescoping movement inside of the housing section 38, due to the provision of the coil spring 42' mounted between the swivel box and the gland 37. Thus it is possible to telescope the control pipe relative to the housing so as to bring the openings 39 and 40 into registration with each other when it is desired to effect circulation either from within the operating pipe into the well bore outside of the tool or the reverse thereof from outside of the tool into the control pipe. These ports are shown aligned to permit circulation either into or out of the tool at the top of Fig. 6. The port 39 is safeguarded by suitable packings 41, 42 so as to also prevent leakage along the inside of the housing.

A nipple 43 is threaded on to the lower end of the section 38 and is recessed at 44 to receive a flange 45 on the support sleeve 46 which sleeve has an upstanding extension 47 disposed in a recessed area in the lower end of the section 38. When the nipple or coupling 43 is tightened on the housing section 38, this sleeve 46 will be firmly anchored with respect to the housing section 38 and nipple 43.

This sleeve 46 in combination with the nipple 43 serves as an anchorage for the upper end of the packer assembly 49. This packer assembly is of a peculiar construction as will be later described and is designed specifically to withstand tremendous pressures.

This packer 49 can be inflated upon moving the control pipe relative to the sleeve 46 to position the openings 50 in the control pipe in alignment with the openings 51 in the support sleeve 46. This position is best seen in Fig. 2, and is preferably the position assumed when the tool is being lowered into the well bore. These openings 50 and 51 serve as an entry for pressure fluid to inflate the packer by extending the flexible portions 52 thereof.

The lower end of the packer assembly 49 is suitably anchored in a head or collar 53 which is slidably mounted upon the stem 46 and has a packing 54 therein engaging sleeve 46 to prevent leakage between the sleeve and collar. This collar 53 is slidable on the stem in response to inflation of the resilient packing assembly which will shorten as to its length when it extends in diameter.

Threadedly connected to the lower end of the support sleeve 46 is the flow bushing 55 which is slidable on the control pipe 34. Bushing 55 has a series of openings 56 therein so as to permit the discharge or intake of fluid from the isolated section of the formation. These ports may contain a strainer 57 to filter the material and prevent clogging of the tool. A series of packings 58 in bushing 55 above and below the ports 56 maintain a seal between the bushing and the control pipe 34.

This control pipe has a series of openings 60 therein which are arranged to be moved into alignment with the ports 56 as best seen in Fig. 11 so as to permit either the discharge of liquid or material under pressure from inside of the control pipe as in the treating, acidizing or cementing of formations or the opening of these ports may permit the inflow of fluid from the formation if there is a differential pressure between the inside of the control pipe and the formation as in the case of a testing operation to obtain samples of fluid from the formation.

Connected to this flow bushing 55 and slidable on control pipe 34 is a collar or packer head 61 which carries a second sleeve 62, which is identical in all respects with the sleeve 46 previously described in the upper packer 6. This support sleeve 62 serves as a connection for the anchor assembly of the packer 4, as will be later described. This support sleeve 62 has a series of openings 64 guarded by the packing 65 on each side thereof which are arranged to be aligned with the openings 66 in the control pipe for pressure to inflate the packer 4. A lower head or collar 67 is mounted on the sleeve 62.

The lower end of this sleeve 62 has an external flange 69 thereon and carries a cap 68 which fits over and confines the flange 69 and is threaded into the base or end piece 3 of the tool. This construction is the same as that described at the top of the upper packer 6 in Fig. 2.

The foot or base piece 3 has outlets 71 therein and a central opening 72 which extends beyond these outlets into the very bottom of the base piece. It is apparent that when this opening 72 is unobstructed, that a flow of fluid could be discharged from the base piece through the openings 71 or there could be an inflow of fluid into the tool by this means.

Fig. 4, however, shows a go-devil 73 as fitting snugly into this opening 72 and extending beyond the ports 71. A series of packings 74 above and below ports 71 provide a seal about the go-devil to prevent leakage when it is in the position shown in Fig. 4.

Figure 14:
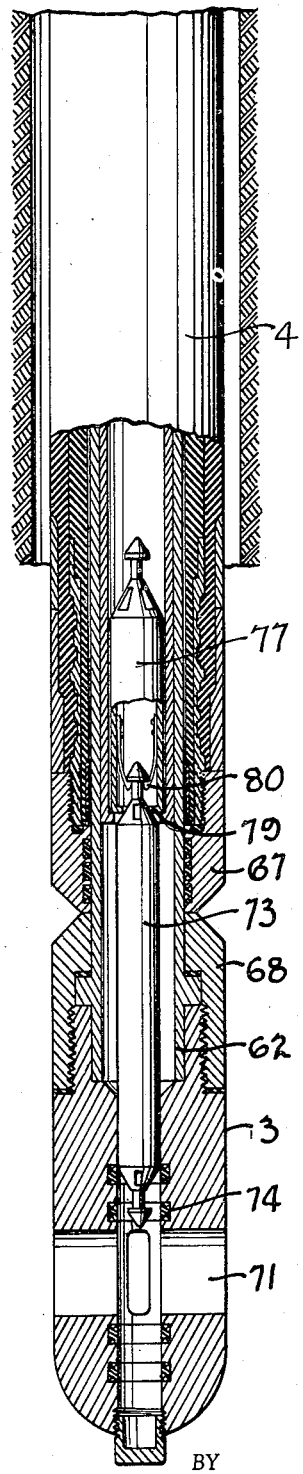
Figure 15:
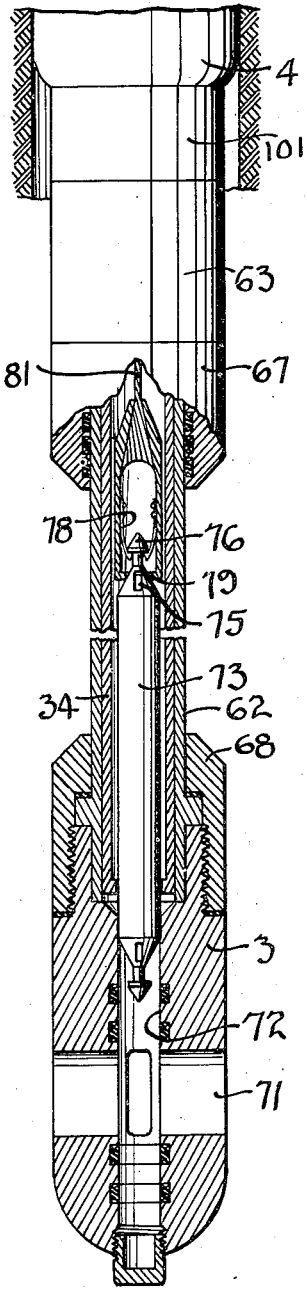

The go-devil is a hollow member having upper and lower ports 75 so that when it is in the position of Figs. 14 or 15 there can be a flow of fluid therethru so as to discharge from the ports 71. However, when the go-devil is in the position of Figs. 4, 8 or 12, the lower end of the tool will be closed.

This go-devil is of particular construction in that it has a head 76 thereon which is arranged to receive either the overshot fishing tool 77 as seen in Fig. 14, or to receive the overshot retrieving tool 78, as seen in Fig. 15. Both of these instruments are arranged to latch upon the head 76 so as to elevate the go-devil to the position of Fig. 14. In turn, the overshot is then elevated by the control pipe 34, due to the provision of a flange 79 thereon, which receives the overshot.

The fingers 80 on the overshot serve to latch the overshot to the head 76 and if this overshot is dropped while the parts are in the position of Fig. 13, it will latch in place. The raising of the control pipe to the position of Fig. 14 thus elevates the go-devil so as to open the tool for circulation. On the other hand, if the go-devil is to be completely retrieved, the overshot fishing tool 78 of Fig. 15 may be lowered upon the wireline or cable 81 to catch and retrieve the go-devil or to catch the fishing tool 77 as well.

The parts will be assembled as shown in Figs. 1 to 4 inclusive and lowered into the well bore. The go-devil 73 may or may not be in position as desired, depending upon whether the tool is to be run in empty of liquid or dry in which instance the go-devil will be in place, and the tool will contain liquid or be run wet if the go-devil is absent.

Preferably the tool is run in wet with the go-devil missing so that when it arrives at the elevation of the formation which is to be treated or tested, a circulation may be set up either to wash the well so as to remove any cuttings or sediment which may remain in place, to replace the drilling mud with some other fluid, such as water, oil or a suitable chemical, or the circulation may be for the sole purpose of equalizing the drilling mud throughout the well bore. In either event, the circulation may be downwardly through the operating pipe and outwardly through the opening 71 to return upwardly through the well bore.

The ports 50 and 66 are preferably aligned with ports 51 and 64, respectively, at this time but the packers will not inflate, due to the fact that there is an equal pressure on the inside and the outside thereof. In order to close the tool and make ready for the test or treating operation, the go-devil will now be dropped so that it will fall into the position shown in Fig. 4 to close the lower end of the tool.

The seating of the go-devil closes the lower end of the tool and permits a pressure to be built up in the control pipe 34 which pressure will pass out through the openings 50 and 51 to inflate the upper packer 6 and through the openings 64 and 66 to inflate the lower packer 4.

The next operation is to manipulate the control pipe 34 by means of the hydraulic lift so as to lower it a sufficient distance to close off the packers and lock the pressure liquid therein so that the packers remain inflated and the parts will be moved to the positions shown in Figs. 5 to 8 inclusive, with the packers inflated and the tool opened for circulation above the packers by moving the openings 39 and 40 into alignment as seen at the top of Fig. 6. This opens the tool to the well bore above the packer and if desired, circulation may be established so as to prevent gelling of the drilling fluid or to wash out any sediment which may have occurred during the inflation of the packers or if desired, the circulation may be reversed by reversing the flow through the flow lines 25 and by the introduction of fluid into the casing so that it will flow downwardly into the well bore, enter the openings 39 and the ports 40 and move upwardly through the control pipe 34 and the manipulating string of pipe 8. In this manner the static head or pressure inside of the tool may be substantially reduced by utilizing a liquid of lighter specific gravity than the mud or other fluid which was theretofore in the well bore. Such an operation is desirable because the heavy mud is necessary in the well bore to hold back pressure in the formation which is to be tested but after the packers have been inflated and set, then the isolated section of the formation and the high pressure therein will be blocked off and a flushing fluid can be circulated into the well head to reduce the static head and to encourage the fluid from the formation to enter the tool when it is opened.

In some instances in order to reduce or completely remove any pressure from within the tool upon or against the isolated section of formation, it may be desirable to empty the drill pipe of liquid. To do this the tool will be manipulated to open the ports above the packers after they have been set and locked and to then force air or gas down the drill pipe to expel the liquid into the well bore. All or any part of the liquid can be thus expelled to reduce the load in the pipe. The ports are then closed and the tool opened to the formation with little or no pressure present in the tool.

If desired, the tool can be closed after setting the packers and a swab or bailer run in to remove as much of the liquid in the pipe as desired.

Regardless of which operation is being performed, the tool may be opened to the formation or closed as desired, to obtain information as to conditions existing. If an acidizing or cementing operation is to be carried on, of course, the material to be applied will be forced downwardly thru the operating pipe to discharge from the ports 56 into the isolated section of the formation. If a cement squeeze job is being performed, suitable pressure may be maintained upon the material until an initial set is taken.

In other situations, however, the tool may be retrieved to the surface containing the sample and if this is desired then of course, the ports 50 and 51 in the upper packer and 64 and 66 in the lower packer will be moved into alignment so as to permit the packer to deflate, whereupon, the apparatus can be removed and the sample recovered.

If the sample is removed and it is desired to reset the tool at some other formation or elevation, the packers can be deflated as just described and then reset as originally explained after moving the tool to the desired elevation. In connection with any of these operations circulation may be had just as soon as the sample is removed. In connection with the cementing or acidizing, the same procedure can be followed, except for the swabbing of the tool which may be resorted to in order to clean the cement or acid from the tool or, as previously described, circulation may be had to effect such removal. Removal of the tool or the resetting of the tool at different elevations can, of course, be carried out with the acidizing or cementing.

On the other hand it seems also obvious that the tool may be assembled with but one packer instead of the two packers shown. Under these circumstances the packer would separate the well bore into two sections and the section of the well below the packer would thus be protected against the column of liquid in the well thereabove. Such an operation may be employed where the test or treatment is to take place near the bottom of a well bore.

The tool adapts itself for a multiple of uses, due to the fact that circulation can be had either above or below the packers; that the packers can be inflated and deflated at will by the mere manipulation of the control pipe; that accurate manipulation of the control pipe can be obtained by the arrangement of the hydraulic lift so that the control pipe can be positioned as desired to open or close any particular set of openings and when the tool is used in combination with the manipulation of the go-devil, then circulation may be had below the tool either to condition the liquid in the well or to alter the liquid or to assist in the application of pressure in the release of the packers.

Figure 22:
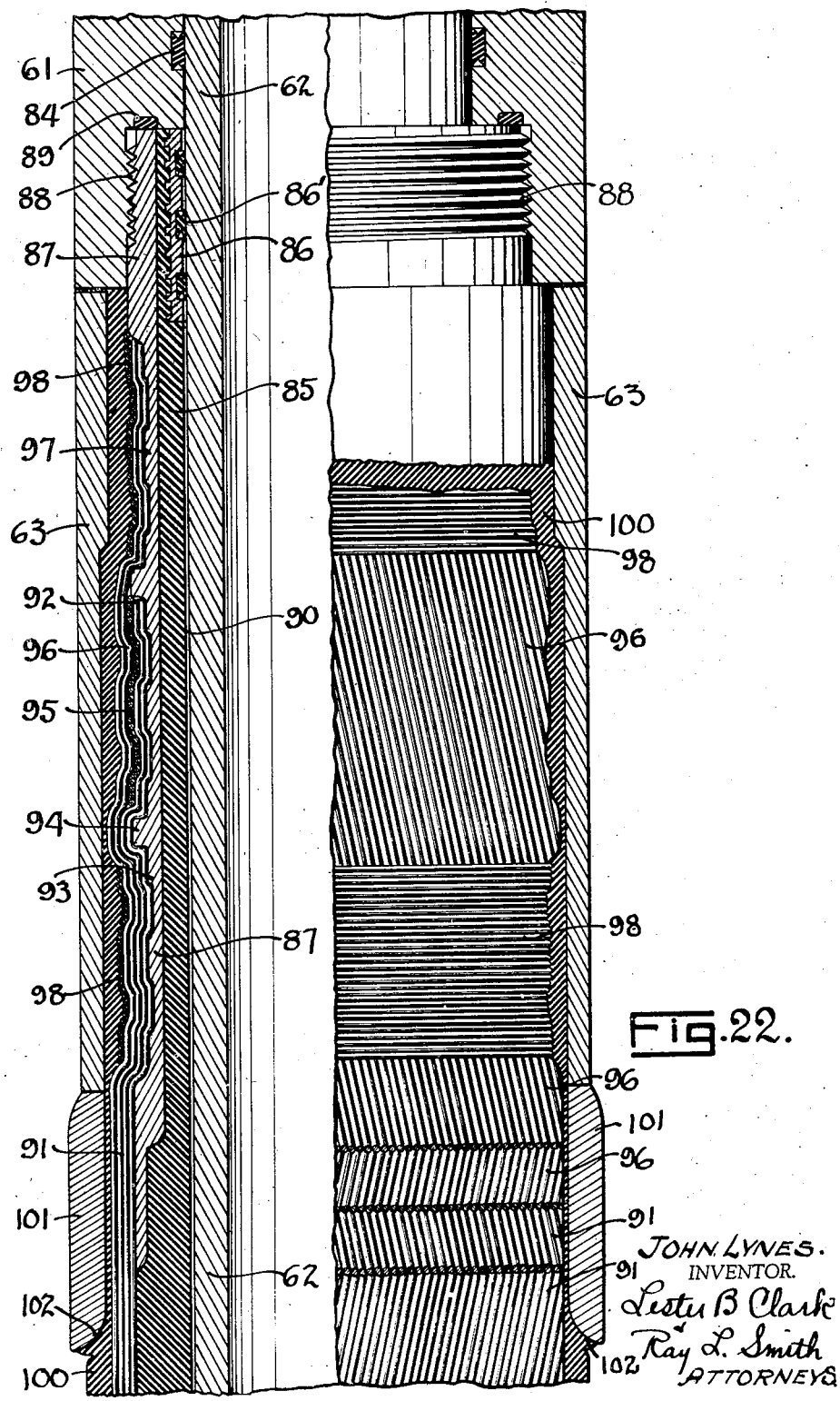
Fig. 22 is a vertical sectional view showing the parts and construction in the fabrication of the end of the packers.

In view of the fact that the tool is designed to withstand tremendous pressures, a special anchoring structure has been provided for the resilient portions of the packer. This anchoring structure is best seen in Fig. 22, which shows only one end of a typical arrangement of the packer assembly structure. In this arrangement the anchor assembly is made up of the upper head 61 of one of the packers and is illustrated as including the packer or anchor nipple 87, the sleeve or anchor collar 63 and retainer ring 86, and connected to the anchor pipe sleeve 62 (the control pipe 34 being omitted in Fig. 22). This enlarged view in Fig. 22 shows additional details not illustrated in the smaller scale forms in the other figures.

To assist in providing a seal between the head 61 and the support sleeve 62, an additional packing 84 has been provided. Disposed around the sleeve 62 is an inner seal tube 85 of resilient material. This tube is shown as being held in expanded position at one end by a seal and retainer ring 86 which normally forces the tube against the anchor or packer nipple 87 which is shown as being threaded at 88 to the inside of the lower end of the head 61.

A series of packing rings 86' are shown on the inside of the ring 86 and maintain a seal between the ring and the pipe or sleeve 62 and tend to hold the serrations on the outside of the ring in close engagement with the resilient tube 85. A packing 89 provides an additional seal between the end of nipple 87 and head 61. The pressure fluid passing thru the openings such as 64 in the sleeve 62 will flow along the outside of the sleeve 62 and will occupy the space 90 between the inner seal tube 85 and the sleeve 62. The packing gaskets 86' and 89 assist in confining this pressure. This pressure inside of the inner seal tube forces the inner seal tube against the inner face of the anchor nipple 87 so that it is automatically self sealing to prevent leakage between the nipple and the upper surface of the inner seal tube.

In order to confine this inner seal tube a plurality of strands of reinforcing material 91 are arranged in laminated form over the outside of the inner tube.

Fig. 22 shows four layers of these wires or strands and the broken away portion at the right hand lower side of Fig. 22 illustrates how successive layers of these wires are cross wrapped or wrapped in opposite directions on a helix so as to permit of expansion and contraction in order to confine the inner seal tube 85. The two inside layers of wire are shown as terminating at 92 after having been fitted over and closely contacting a plurality of ribs or ridges 93 and 94 formed on the outer periphery of the nipple 87. Suitable wrappings 95 of wire or other material serve to confine the ends of the strands. The two layers 96 overlie the wrappings 95 and contact an additional series of ridges or ribs 97 and are in turn anchored by the wrappings 98 closely adjacent the upper end of the nipple 87.

An outer casing 100 of a suitable resilient material is then positioned over these strands of wire so as to form a complete packer assembly. This outer casing is in turn held in place by the sleeve 63 which overlies the end thereof. In order to provide for the expansion or movement of both the outer casing 100 and the inner seal tube 85, an anchor collar 101 extends slightly beyond the outer sleeve 63 and has its lower end curved at 102 so as to avoid cutting or damage to the outer casing when it moves to the expanded position shown for instance in Figs. 6 and 10.

It should be apparent that when a pressure approximating 10,000 pounds per square inch is forced thru the openings and into the packer assembly, that there is a tremendous pull upon the inner seal tube and the reinforcing strands. It has been found in actual practice, however, that an anchorage of the tube here disclosed serves adequately to resist the pull of the ends of the strands and withstand pressures approximating 10,000 pounds per square inch.

The packer must withstand tremendous pressures of this sort because in some instances when the packers are expanded, as shown in Figs. 10 and 11, and the flow bushing 55 opened by aligning the ports 56 and 60, it is possible that the pressure inside of the control and the operating pipes may be reduced to zero or to atmospheric pressure, either due to flow of gas which may be permitted to expel all of the liquid from the operating pipe, or due to the fact that the operating pipe may have been swabbed out to encourage an inflow of fluid from the formation. Under these conditions, if the tool is set in a deep well where the pressure of a static column of liquid may approximate 10,000 pounds per square inch, then it seems obvious that a substantially equivalent pressure will be necessary inside of the inflated packer in order to hold the packer in position against the walls of the formation or casing in which it is set. It is possible, therefore, that there may be a high differential pressure across the packer of several thousand pounds per square inch.

The particular arrangement of the strands of reinforcing wire or other material can, of course, be varied but the present arrangement discloses a plurality of wires lying side by side constituting each layer and wrapped in a helix about the entire tube or the adjacent layer. Adjacent layers are shown as having been wrapped in opposite directions so as to permit a working or movement of the relative layers with respect to each other, which is desirable when the packer expands.

Figure 23:
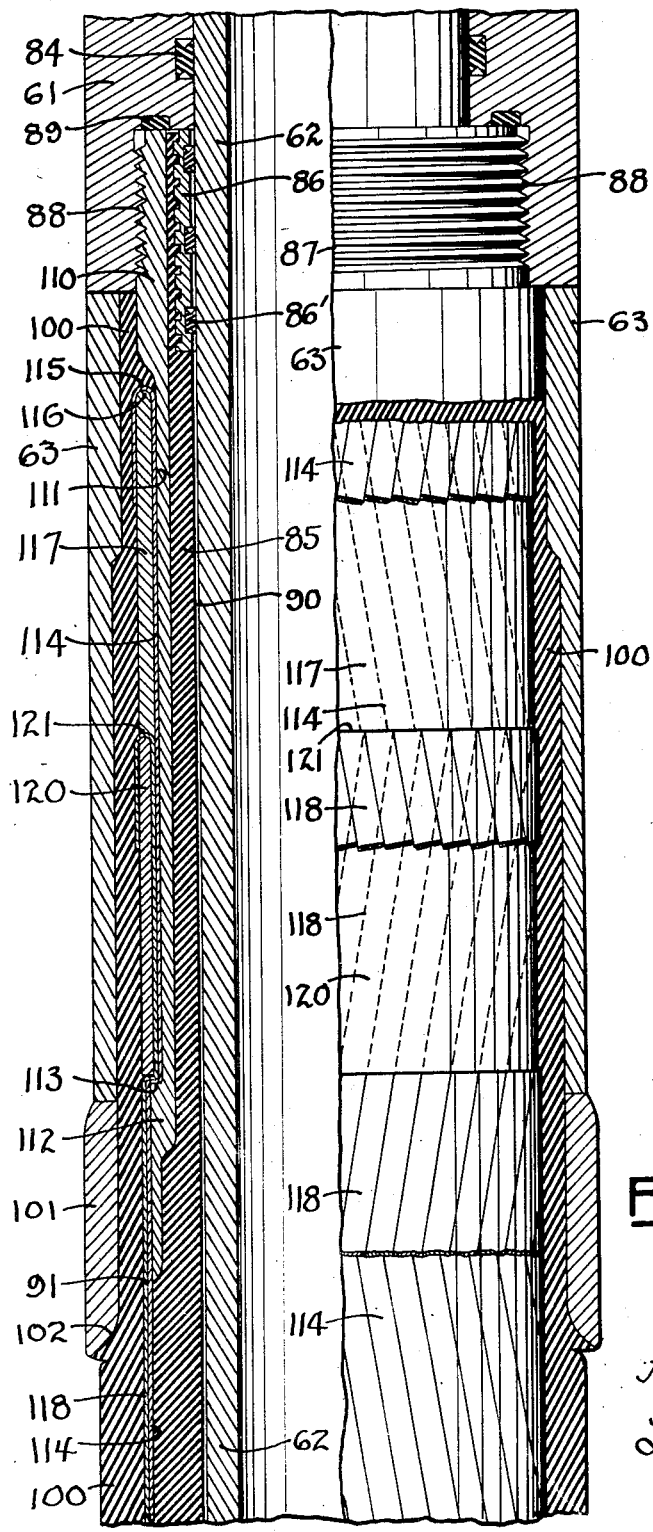
Fig. 23 shows a modified arrangement of Fig. 22.

Fig. 23 shows a view of the end of the packer which is the same as Fig. 22 except for modification in the anchoring of the web or reinforcing strand of material. All of the parts are the same except the nipple 87 which is shown in Fig. 23 at 110. The intermediate ribs 94 have been omitted and a smooth peripheral surface 111 of somewhat reduced diameter is shown with the enlargement 112 near the lower end of the nipple, the same as provided in Fig. 22. This construction furnishes a shoulder 113 over which the strands 91 will pass and will be forced downwardly against the peripheral surface 111. The inside layer 114 of these strands will pass along this surface 111 to the point 115 where they will be bent back or reversed and passed over the upper end 116 of a collar 117, so as to firmly anchor them in position. The collar 117 may be formed integral with the sleeve 110 by machining suitable openings therethru for the strands, or the collar may be in the form of a separate band firmly anchored by welding or otherwise after the strands have been laid in position.

To anchor the outer layer 118 of the reinforcing web, an additional anchor collar 120 has been provided and it will overlie both the layers 118 and 114. The layer 118 will be reversed as at 121 and turned back over the upper edge of this anchor collar 120. The outer covering 100 can then be applied as previously described in connection with Fig. 22 and the other structure assembled so as to provide a permanent assembly.

The foregoing arrangement provides a simplified form for anchoring the wires or web construction and illustrates a flat strap like reinforcing member, as seen by the overturned ends in Fig. 23 as compared with the wires shown in Fig. 22. It will be noted that the layers 114 and 118 are cross wrapped so as to provide for expansion and contraction. The collar 120 may be positioned in any desired manner by welding or otherwise so as to seat it inside of the reduced portion of the sleeve 110.

Broadly, the invention also contemplates a particular anchoring for high pressure packers embodying an inner seal tube, a jacket of confining strands and an outer casing of resilient material overlying and sealing the strands.

This application is a continuation of my prior co-pending patent application, Serial 473,928, filed January 29, 1943, for the same invention and is entitled to the benefit of the filing date of said prior copending application.

What is claimed is:

1. A hydraulically inflatable packer for wells comprising an inner tube of expansible material a separate annular anchor nipple overlying each end of said inner tube, an expansible sheath including metal strands surrounding said inner tube and said anchor nipples, an outer tubular casing of resilient material overlying said sheath, and a separate packer head for each end of said packer anchoring said sheath between such head and said anchor nipples.

2. A hydraulically inflatable packer including, a resilient inner tube, a separate annular anchor nipple overlying each end of said inner tube, a separate packer head for each end of said packer and secured to the adjacent anchor nipple, an expansible metal stranded sheath applied over said nipples and surrounding said liner, a collar about the stranded sheath with the ends of the strands projecting through the collar and bent back over the outside of said collar, an outer resilient casing overlying said sheath and rigid annular anchor means surrounding and securing the ends of said casing and said sheath.

3. A hydraulic packer for a well comprising, an inner tube of resilient material, a separate packer head for receiving each end of said tube, a separate packer nipple fitting adjacent each of said heads and surrounding said tube, an expansible sheath including metal web surrounding and confining said inner tube and overlying each of said nipples, and an outer tubular casing of resilient material overlying said sheath, said packer heads cooperating with said nipples to anchor the end portions of said sheath.

4. A hydraulically inflatable packer comprising, an expansible inner tube, an expansible annular metal sheath overlying and surrounding said inner tube, an outer tubular casing of resilient material surrounding said sheath, and a separate annular anchor means adjacent each end of said packer anchoring each end of said sheath and outer tubular casing.

5. A hydraulic packer comprising, a pair of spaced, annular heads, an annular inner liner of resilient material having an end extending into each of said heads, an expansible reinforcing sheath extending longitudinally of and surrounding said liner, and anchor means adjacent each end of said packer surrounding and confining each said sheath and inner liner.

6. A hydraulic packer comprising a pair of spaced, annular packer heads, an inner tube of resilient material having an end extending into each of said heads, a plurality of strands of wires extending longitudinally of said tube and surrounding and confining said tube, a separate anchor nipple engaging each of said packer heads, said nipples overlying and surrounding said inner tube and underlying said strands of wires, an outer expansible casing surrounding said strands, and annular anchor means adjacent each end of said packer anchoring each end of said casing and strands of wire.

7. A hydraulically inflatable packer comprising, an annular sheath of metallic reinforcing material, a resilient inner liner tube extending longitudinally within said sheath to confine the inflating liquid within said tube, an outer casing of resilient material surrounding said sheath, means anchoring the ends of said sheath, said means including a separate nipple around said liner tube and within each end of the sheath, and a collar fitting around said sheath and overlying each of said nipples.

8. In a hydraulically inflatable packer, an inner tube of resilient material, an expansible sheath including metal strands surrounding and confining said inner tube, and anchor means adjacent each end of said packer securing each end of said sheath and receiving each end of said tube.

9. In a hydraulically inflatable packer, a resilient inner tube, an expansible sheath including metal strands surrounding and confining said inner tube, an outer casing surrounding said confining sheath, and anchor means adjacent each end of said packer securing each end of said sheath and receiving each end of said tube.

10. A hydraulically inflatable packer including a resilient inner tube, a separate anchor nipple overlying each end of said tube, an expansible sheath including metal strands applied over said nipples and surrounding said tube, and a collar about each end of said sheath, said collar cooperating with said nipple to secure said sheath therebetween.

11. A hydraulic packer comprising an inner tube of expansible material, a separate anchor nipple overlying each end of said tube, an expansible sheath including metal strands surrounding said inner tube and said anchor nipples, an outer tubular casing of resilient material overlying said sheath, a separate packer head for each end of said packer, said packer head cooperating with said nipple to anchor the end portions of said sheath, and seal means forming a seal between said packer head and said inner tube.

12. A hydraulic packer comprising a resilient inner tube, a separate anchor nipple receiving each end of said tube, an annular sheath of metallic material surrounding said tube and overlying said nipples, an outer casing of resilient material surrounding said sheath, and a collar about each end of said sheath, said collar cooperating with said nipple to grip said sheath therebetween.

JOHN LYNES.

REFERENCES CITED

The following references are of record in the file of this patent:

UNITED STATES PATENTS

| Number | Name | Date |
|---|---|---|
| 820,149 | Spang | May 8, 1906 |
| 1,502,372 | Callanan | July 22, 1924 |
| 1,772,682 | Phipps | Aug. 12, 1930 |
| 2,143,106 | Freelander | Jan. 10, 1939 |
| 2,196,658 | Burt | Apr. 9, 1940 |
| 2,227,731 | Lynes | Jan. 7, 1941 |
| 2,229,635 | Boynton | Jan. 28, 1941 |
| 2,254,060 | Crickmer | Aug. 26, 1941 |